(12) United States Patent
Raz

(10) Patent No.: US 6,311,252 B1
(45) Date of Patent: Oct. 30, 2001

(54) METHOD AND APPARATUS FOR MOVING DATA BETWEEN STORAGE LEVELS OF A HIERARCHICALLY ARRANGED DATA STORAGE SYSTEM

(75) Inventor: Yoav Raz, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/885,263

(22) Filed: Jun. 30, 1997

(51) Int. Cl.[7] ............................. G06F 13/00; G06F 12/08
(52) U.S. Cl. ........................ 711/117; 711/4; 711/165; 711/112; 711/209; 711/118; 711/122; 711/171; 711/161
(58) Field of Search ................................. 711/117, 118, 711/4, 171, 165, 209, 122, 112, 113, 161

(56) References Cited

U.S. PATENT DOCUMENTS

| | | | |
|---|---|---|---|
| 5,206,939 | * 4/1993 | Yanai et al. | 711/4 |
| 5,737,747 | * 4/1998 | Vishlitzky et al. | 711/118 |
| 5,778,394 | * 7/1998 | Galtzur et al. | 707/205 |
| 5,802,557 | * 9/1998 | Vishlitzky et al. | 711/112 |
| 5,809,435 | * 9/1998 | Yeger et al. | 711/118 |

* cited by examiner

*Primary Examiner*—Glenn Gossage
(74) *Attorney, Agent, or Firm*—Fish & Richardson P.C.

(57) ABSTRACT

A method of moving data between first, second, and third storage levels of a hierarchically arranged data storage system is described. The method includes the steps of dividing address space into a plurality of contiguous segments, each of which is further divided into a plurality of contiguous groups. Each of the groups may store a sequence of records, each of which is represented by a sequence of bytes. When it is necessary to move a designated record between the second and third levels of the data storage system, the segment in which that designated record is stored is moved; and when it is necessary to move the designated record between the first and second levels, the group in which that designated record is stored is moved.

30 Claims, 2 Drawing Sheets

METHOD AND APPARATUS FOR MOVING DATA BETWEEN STORAGE LEVELS OF A HIERARCHICALLY ARRANGED DATA STORAGE SYSTEM

BACKGROUND OF THE INVENTION

The invention relates generally to hierarchical data storage systems and more particularly to data storage management in such systems.

Data storage systems are available for use by host processors to store the increasingly large amounts of data that are being generated, accessed, and or analyzed by applications running on those host processors. Today the capacity of such data storage systems is measured in terra bytes.

A typical data storage system might include three levels of data storage, namely, a cache memory, an array of disks, and a tertiary storage device, such as a tape drive or a farm of tape drives, that can be connected to the system through an appropriate interface. The cache memory, which may be implemented by high speed RAM (Random Access Memory), provides storage for data that is being accessed by the applications running on the host processors. It is the working memory. The array of disks, which provides much larger storage capacity than the cache memory and might include hundreds of disk devices, provides the more permanent storage for the data. The disks are not practical for use as the working memory because they are much slower than the cache memories. Data is staged from the array of disks (i.e., the slower storage) to cache memory (the faster storage) when it is needed by the host processors and it is destaged back from cache memory to the array of disks when it is not needed.

The tertiary storage provides the most permanent storage for the data. Since the tape drives that are often used for the tertiary storage are much slower than the disk devices, the tertiary storage is only used for data that is accessed very infrequently.

Known techniques are available for moving data from tertiary storage to cache storage and for determining what data should be moved to tertiary storage. Typically, the decision on what data should be destaged is based on some measure of access frequency. In general, the systems which include such multiple levels of storage are referred to as hierarchical data storage systems and the techniques for managing the data flow between the levels are referred to generally as hierarchical storage management.

SUMMARY OF THE INVENTION

In general, the invention is a hierarchical storage management system which uses a constrained mapping scheme.

In one aspect, the invention is a method of moving data between first, second, and third storage levels of a hierarchically arranged data storage system. The method includes dividing address space into a plurality of contiguous segments, each of which is further divided into a plurality of contiguous groups. Each of the groups may store a sequence of records, each of which is represented by a sequence of bytes. When it is necessary to move a designated record between the second and third levels of data storage, the segment in which that designated record is stored is moved; and when it is necessary to move the designated record between the first and second levels, the group in which that designated record is stored is moved.

Preferred embodiments include the following features. The data storage system includes cache memory, disk arrays, and tape drives, and the method further includes the steps of: implementing the first level of data storage in the cache memory; implementing the second level of storage in the disk arrays; and implementing the third level of storage in the tape drives.

In general, in another aspect, the invention includes the steps of dividing address space in the manner described above and then constraining data movement between the first and second levels to be in blocks made up of one or more groups; and constraining data movement between the second and third levels to be in blocks made up of one or more segments.

In general, in still another aspect, the invention includes the steps of dividing address space in the manner described above and then moving data between the second and third levels only in blocks that are made up of one or more segments; and moving data between the first and second levels only in blocks that are made up of one or more groups.

In preferred embodiments, the step of moving data between the second and third levels involves moving data only in blocks that are made up of one segment, and the step of moving data between the first and second levels involves moving data only in blocks that are made up of one group.

In general, in yet still another aspect, the invention is directed to a hierarchical data storage system for use by one or more host processors to store data. The system includes: one or more interfaces by which the one or more host processors are connected to the data storage system; an internal bus; a cache memory, an array of disks, and a controller connected to the bus; and an interface for connecting a tertiary storage devices to the storage system. The into a plurality of contiguous groups, wherein each of the groups is for storing a sequence of records. The controller is programmed to perform the following functions: when it is necessary to move a designated record between the tertiary storage device and the array of disks, the controller moves the segment in which that designated record is stored; and when it is necessary to move the designated record between the cache memory and the array of disks, the controller moves the group in which that designated record is stored.

The addressing approach used in the invention allows for very compact indexes and this in turn allows for quick access rates. It produces a substantial decrease in the size of the index that is required and it preserves order among the data that is stored in the system.

Other advantages and features will become apparent from the following description of the preferred embodiment and from the claims.

Description of the Preferred Embodiments

Figure 1:
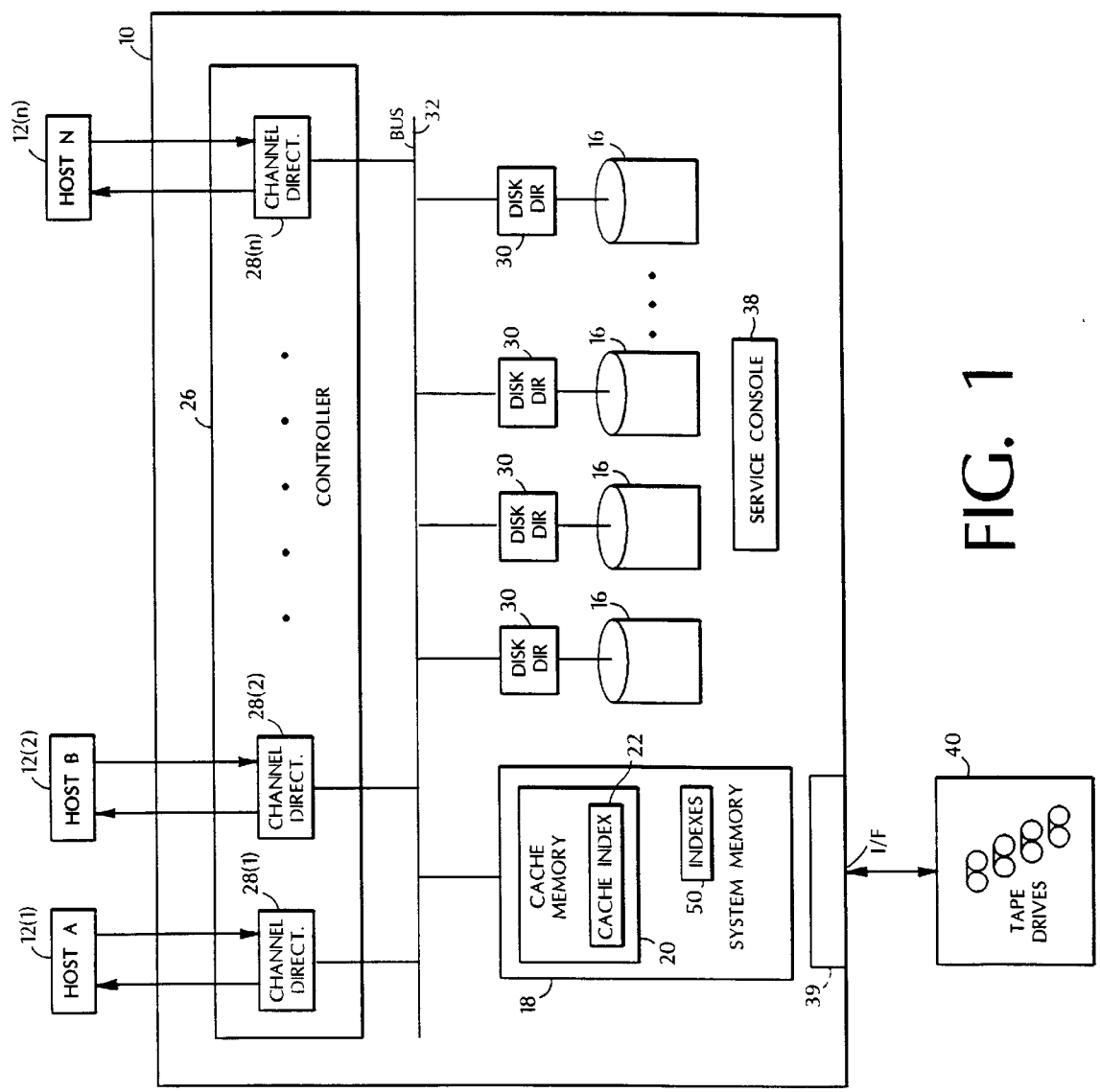
FIG. 1 is a block diagram of a system in which hierarchical data storage is implemented.

Referring to FIG. 1, the system in which the hierarchical data storage is implemented includes a data storage system 10 to which a plurality of host processors 12(i) (referred to generally as host processors 12) are connected through respective host connections. Data storage system 10 contains the physical memory in which the data (e.g. the records of the database) are stored. The particular details and manner in which the physical memory within storage system is implemented and how it is partitioned are not of central importance. Examples of commercially available products that can be used to implement data storage system 10 are the Symmetrix™ 5XXX series family of products from EMC Corporation of Hopkinton, Mass., which are high performance integrated cache disk arrays designed for online data storage. The following description will generally refer to the Symmetrix™ data storage systems. However, it should be understood that data storage systems of other known architectures may also be used. In essence, the data storage system should include cache memory, disk storage, and a controller to which the hosts connect and which interprets host commands and manages data movement, storage, and retrieval within the data storage system.

In the example shown in FIG. 1, which is a block diagram of a Symmetrix™ product, data storage system 10 includes multiple arrays of disk devices 16 and a system memory 18, a portion of which implements cache memory 20. Connected to data storage system 10 there is also a tape drive or tape drive farm 40. Cache memory 20 provides a temporary data storage area for data that is being manipulated or used by the host processors, the disk arrays 16 provide intermediate storage for data that is staged to and destaged from cache memory, and the tape drives provide relatively permanent long term storage for data that is not accessed very frequently.

Each disk device 16 includes a head-disk assembly, a microprocessor, and a data buffer which enables the data storage system to provide for parallel processing of data. In the described embodiment, system memory 18 is implemented by high-speed semiconductor random-access memory (RAM). Within cache memory 20 there is a cache index directory 22 which provides an indication of what data is stored in cache memory 20 and the address of that data in cache memory 20. Cache index directory 22 is organized as a hierarchy of tables for devices, cylinders, and tracks of data records, as further described in U.S. Pat. No. 5,206,939, issued Apr. 27, 1993, and incorporated herein by reference.

There is a controller 26 which includes a group of channel directors 28($i$)–($n$) (hereinafter referred to generally as channel directors 28) that provide interfaces through which host processors 12 connect to data storage system 10. Each of the channel directors 28 provides for direct attachment to the physical host connections and handles I/O requests from host processors 12. Each channel director 28 contains a microprocessor that processes commands and data from host processors 12 and manages accesses to cache memory 20. It uses cache index directory 22 which is stored in cache memory 20 to determine whether the request can be satisfied out of the cache or whether the data must be obtained from disk devices 16. The particular data that is stored in cache memory is determined by the data access patterns of the data base applications that are running. Channel directors 28 write data from host processors 12 into cache memory 20 and update cache index directory 22. They also access cache index directory 22 and read data from cache memory 20 for transfer to host processors 12.

There are also a set of disk directors 30 through which each disk device array 16 is connected to cache memory 20. The disk directors 30 interface to multiple SCSI (Small Computer System Interference), high speed bus 33 to which disk device arrays 16 are connected. The disk directors 30 manage accesses to the disks within disk device arrays 16. The disk directors 30 stage data from the disk device arrays to cache memory 20 and it updates cache index directory 22, accordingly. It also de-stages or writes-back data from "written-to" blocks in cache memory 20 to the disk device arrays 16 and again updates cache index directory 22, accordingly.

Both channel directors 28 and disk directors 30 access system memory 18 through a high-speed, parallel line system bus 32. System memory 18 is implemented by multiple memory boards. Only one access to any given memory board may occur at any given time, however, multiple memory boards may be accessed at the same time to support concurrent operations.

A service console 38 within data storage system 10 enables the user to configure the data storage, i.e., to define the logical volumes and to specify which logical volumes are accessible through which host connections 12.

The channel directors 28 and cache 20 handle the storage control functions in the unit. The disk directors 30 handle the data storage functions. Since the system contains multiple channel directors, each supplying an independent path to cache from the host system, data transfers with the host systems are possible through all channel directors simultaneously. The controller 26 controls the staging and destaging of data between the disk arrays and the tape drives and in general it implements the rules for such data movement, as it does for the data movement between cache memory and the disk arrays. In general, there are alternative algorithms for determining when data should be staged and destaged. Some of the algorithms are frequency based. That is, they destage data based upon which data has been accessed least frequently. The particular algorithm is not of central importance to this invention and thus the details of the staging and destaging algorithms are not presented here.

With the aid of the service console 38, the user can configure the data storage system 10 into multiple logical volumes, which are user-defined storage devices. In the described embodiment, a logical volume is a single physical device, e.g. disk, though it could also be a portion of a disk or multiple disks. Indeed, given that disks continue to grow in size as the technology advances, it is likely that it may be desirable in certain system to define the volume as a portion of a disk. In any event, logical volumes are mapped in an orderly manner to physical devices.

The data storage system also includes an interface 39 to which a tertiary storage device 40 (e.g. a tape drive or a farm of tape drives) can be connected to the system. Interface 39, which is connected to bus 32 through its own director (not shown) provides a communication channel to the disk arrays so that data can be transferred between the disk arrays and the tertiary storage device.

Moving data between cache and the logical volumes and between the logical volumes and the tape drives involves blocks of contiguous data, referred to herein as slots. In general, the slot is a region of address space which represents a contiguous set of records, where a record is a block of data that is the smallest sequence of bytes that can be moved during an I/O operation. In an open system (e.g. a UNIX system), it is typically 512 bytes and in an MVS (Multiple Virtual Storage) system, it can have variable size.

In the three level hierarchical data storage system described herein, there are cache slots and disk slots. Address space is divided into a sequence of cache slots, each having a corresponding starting address and an ending address that is a predetermined distance above the starting address. A disk slot, which is typically very much larger than the cache slot, is defined as a set of contiguous cache slots with a fixed starting address and an ending address that is a fixed distance above the starting address. Whether it is a cache slot or a disk slot, it is always mapped to a well-defined location within virtual address space. Viewed another way, it can be said that each record has a slot contingency both with respect to the cache slot and the disk slot. By this, we mean that it has a fixed, known location within each.

In the described embodiment, the cache slot is a 32 Kbyte (Kilobyte) block of data and the disk slot is equal in size to a logical volume, which can be larger than a gigabyte. In other words, the disk slot could easily include, for example, thousands, tens of thousands, or even larger numbers of records.

The slot is the smallest unit of data that is moved between levels of data storage. For example, data is moved between the disk storage and cache as cache slots and data is moved between tertiary storage and disk storage as disk slots. In general, a slot has the characteristic that the order of the records within the slot is always maintained, regardless of where the slot is being stored, i.e., cache, disk, or tape. Thus, any given record within a slot is always found at the same relative position within that slot, which also means that each record within a slot always preserves its local neighborhood of other records. In other words, one always find data within a slot all together as it is moved to the different levels of the data storage system.

Note that controller 26 uses cache index director 22 to keep track of all cache slots that are stored in the cache memory and where they are located and it uses another index, identified as index 50 in FIG. 1, to keep track of all disk slots that are stored in the configured logical volumes and where they are located. Because of the orderly manner in which the address space is divided up, the address of each record includes the disk slot, the cache slot, and the offset from the beginning of the cache slot. Thus, it is a simple matter to readily determine both the disk slot and the cache slot for any given record from its address.

Figure 2:
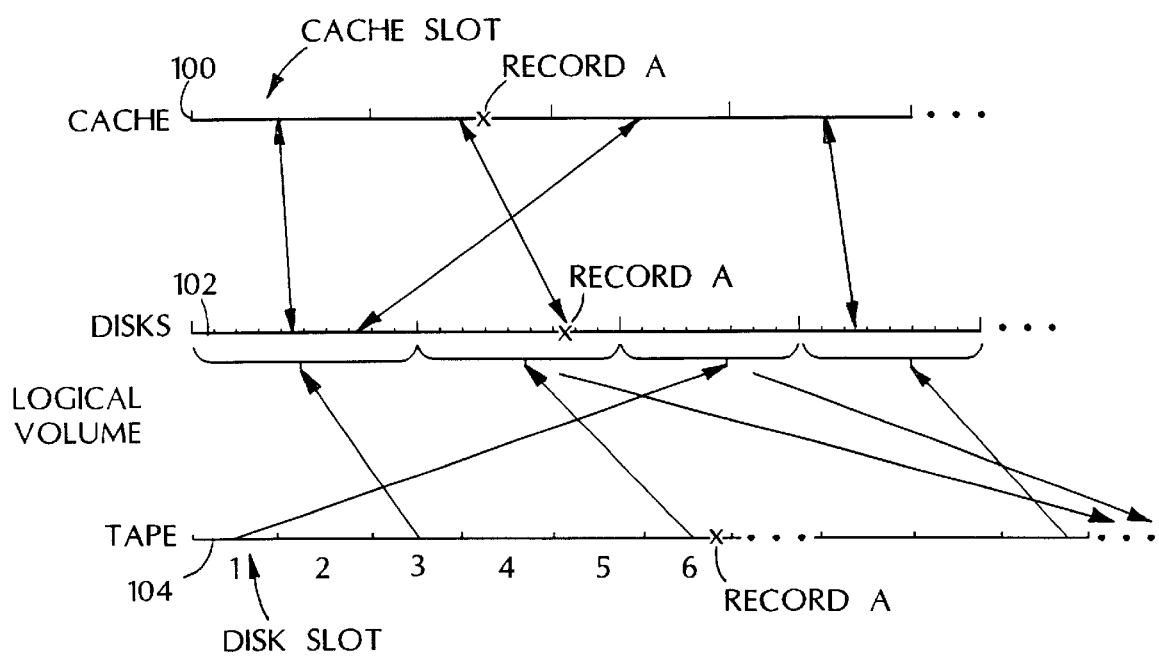
FIG. 2 is diagram illustrating the addressing and data movement technique of the invention.

FIG. 2 presents a schematic illustration of the organization of memory in the three level, hierarchical data storage system. The highest level of data storage, represented by line 100, is cache memory, which is divided into cache slots. The next lower level, represented by line 102 and implemented by disk arrays 16 shown in FIG. 1, is disk storage which is divided into logical volumes. The lowest level, represented by line 104, is tertiary storage, which in the described embodiment is implemented by tape drives 40, also shown in FIG. 1. It is divided into disk slots.

The concept and role of slots can be more clearly understood by examining how a record is moved from one level of data storage to the next. For example, assume that a record A needs to be moved from the tape drive into the disk array from where it will be available to cache memory. To accomplish the transfer of record A, the controller first determines, by looking at its local indexes, whether record A is located either in cache memory or in a logical volume in the disk array. Assuming that the record is in neither location, the controller then locates through an index within the tape system the physical location in tertiary storage of the disk slot that contains record A. Once having identified the physical location of the relevant disk slot, it then moves that disk slot into an available logical volume in the disk array and it updates index 50 (see FIG. 1) to indicate that the disk slot is now in the disk array.

If all of the logical volumes already contain data, it may be necessary to destage data from one of the logical volumes back to tape so as to make room for the new block of data. Various techniques by which one can identify the data that is to be destaged are well known to persons skilled in the art and the way in which this is done is not of central importance to the present invention. Thus, the details will not be provided here. Suffice it to say that some mechanism is used which identifies the appropriate data for destaging.

With the block of data containing record A staged into disk memory, the controller then identifies the cache slot within the logical volume which contains record A and it moves that entire cache slot into available space in cache memory. That is, it either moves that data block including record A into an available cache slot, or it destages data from a cache slot in cache memory to its appropriate location in disk storage, to make an available cache slot in cache memory.

The movement of data in the opposite direction, i.e., from cache memory to disk storage or from disk storage to tape storage, works very much the same way but in reverse. That is, when it is time to destage data from cache memory, the entire contents of the appropriate cache slot in cache memory are written back to the corresponding slot location within the appropriate disk volume, i.e., the disk volume that contains the data for that address range. Similarly, when destaging data from the disk array to the tape drive, disk slots are moved.

In the described embodiment, when a disk slot is moved back to the tape drive, rather than going to the first available slot on the tape, it goes to the first slot that is available at the end of the tape. Thus, data is not written back to the area of the tape from which is was read. The area from which the data was read is simply invalidated and reserved for later use. When the end of the tape is reached, then the freed up slots (which contain previously invalidated data) are used starting from the beginning of the tape. Of course, it should be understood that alternative approaches to mapping of slots to tape could also be used.

Notice that according to this scheme, the same record always goes to the same relative location in a disk device, regardless of which disk device that might be. Also, note that cache slots within a disk device can map to any cache slot inside of the cache. Where it goes, of course, depends upon which cache slot is being replaced, e.g., which cache slot contains records that are least frequently accessed. Similarly, a disk slot from tape can be mapped to any logical volume in the disk space. Where it is mapped depends upon which disk slot experienced the least frequent use. Furthermore, when a disk slot goes to tape, it can go anywhere on tape but the disk volume organization is maintained.

It should be understood that the sizes of the cache slots and the disk slots can be modified to optimize performance of the system. The optimum size, of course, will depend on the characteristics of the hardware and other environment specific details.

The above-described functionality may be implemented in hardware or software or a combination of both. The programs are preferably implemented in microcode that is executed by the controller within the data storage system. The microcode is stored within memory that is local to and readable by the controller.

Other embodiments are within the following claims. For example, though we have described a data storage system in which there are three levels of data storage, the concepts described above can readily be extended to any number of levels.

What is claimed is:

1. A method of moving data between first, second, and third storage levels of a hierarchically arranged data storage system, said method comprising:

dividing address space of said storage system into a plurality of predefined contiguous segments, each of said segments having in said address space a corresponding fixed start address and a corresponding fixed end address, each of said segments being further divided into a plurality of predefined contiguous groups, each of said groups having in said address space a corresponding fixed start address and a corresponding fixed end address in that region of address space defining the segment of which that group is a part and each of said groups for storing a sequence of records, each of which is represented by a sequence of bytes;

whenever it is necessary to move any designated record between the second and third levels of data storage, accomplishing that by moving that particular segment among said plurality of segments in which that designated record is stored; and whenever it is necessary to move the designated record between the first and second levels of data storage, accomplishing that by moving that particular group in which that designated record is stored, that particular group being among said plurality of groups within that particular segment in which said particular record is stored.

2. The method of claim 1 wherein the data storage system includes cache memory, disk arrays, and tape drives, the method further comprising:

implementing the first level of data storage in the cache memory;

implementing the second level of data storage in the disk arrays; and implementing the third level of data storage in the tape drives.

3. The method of claim 1 wherein a group is the smallest block of data that is moved between the first and second levels.

4. The method of claim 1 wherein a segment is the smallest block of data that is moved between the second and third levels.

5. The method of claim 1 wherein a record is the smallest sequence of bytes that is moved during an I/O operation between the data storage system and any external entity which is using the data storage system to store data.

6. The method of claim 1 wherein each segment has a fixed starting address in said address space and a fixed ending address in said address space that is a predetermined distance above the starting address for that segment.

7. The method of claim 1 wherein each group of the plurality of groups of each of said plurality of segments maps to a well-defined location in said address space.

8. The method of claim 1 wherein each segment of said plurality of segments maps to a well-defined location in said address space.

9. The method of claim 1 wherein each record belongs to a unique group of a unique segment.

10. The method of claim 1 wherein each segment equals the size of a single storage disk.

11. A method of moving data between hierarchically arranged levels of data storage in a data storage system, wherein the hierarchically arranged levels include first, second, and third levels, said method comprising:

dividing address space of said storage system into a plurality of predefined contiguous segments, each of said segments having in said address space a corresponding fixed start address and a corresponding fixed end address, each of said segments being further divided into a plurality of predefined contiguous groups, each of said groups having in said address space a corresponding fixed start address and a corresponding fixed end address in that region of address space defining the segment of which that group is a part and each of said groups for storing a contiguous sequence of records;

moving data between the second and third levels only in blocks that are made up of one or more segments selected from among said plurality of contiguous segments; and moving data between the first and second levels only in blocks that are made up of one or more groups selected from among the plurality of contiguous groups that make up a corresponding segment of said plurality of continuous segments.

12. The method of claim 11 wherein a group is the smallest block of data that is moved between the first and second levels.

13. The method of claim 11 wherein a segment is the smallest block of data that is moved between the second and third levels.

14. The method of claim 11 wherein a record is the smallest sequence of bytes that is moved during an I/O operation between the data storage system and any external entity which is using the data storage system to store data.

15. The method of claim 11 wherein each segment has a fixed starting address in said address space and a fixed ending address in said address space that is a predetermined distance above the starting address for that segment.

16. The method of claim 11 wherein each group of the plurality of groups of each of said plurality of segments maps to a well-defined location in said address space.

17. The method of claim 11 wherein each segment of said plurality of segments maps to a well-defined location in said address space.

18. The method of claim 11 wherein each record belongs to a unique group of a unique segment.

19. The method of claim 11 wherein each segment equals the size of a single storage disk.

20. The method of claim 11 wherein the step of moving data between the second and third levels comprises moving data only in blocks that are made up of one segment, and wherein the step of moving data between the first and second levels comprises moving data only in blocks that are made up of one group.

21. The method of claim 20 wherein the data storage system includes cache memory, disk arrays, and tape drives, the method further comprising:

implementing the first level of data storage in the cache memory;

implementing the second level of data storage in the disk arrays; and implementing the third level of data storage in the tape drives.

22. A hierarchical data storage system for use by one or more host processors to store data, said system adapted for use with a tertiary storage device and comprising:

a controller including one or more interfaces through which the one or more host processors are connected to the data storage system;

an internal bus to which the controller is connected;

a cache memory connected to said bus;

an array of disks connected to said bus; and an interface connected to said bus and for connecting said tertiary storage device to the storage system;

wherein address space of said data storage system is divided into a plurality of predefined contiguous segments, each of said segments having in said address space a corresponding fixed start address and a corresponding fixed end address, each of said segments being further divided into a plurality of predefined contiguous groups, each of said groups having in said address space a corresponding fixed start address and a corresponding fixed end address in that region of address space defining the segment of which that group is a part and each of said groups for storing a sequence of records, and wherein the controller is programmed to perform the following functions:

whenever it is necessary to move a designated record between the tertiary storage device and the array of disks, the controller moves that particular segment among said plurality of segments in which that designated record is stored; and whenever it is necessary to move the designated record between the cache memory and the array of disks, the controller moves that particular group in which that designated record is stored, that particular group being among said plurality of groups within that particular segment in which said particular record is stored.

23. The data storage system of claim 22 wherein a group is the smallest block of data that is moved between the first and second levels.

24. The data storage system of claim 22 wherein a segment is the smallest block of data that is moved between the second and third levels.

25. The data storage system of claim 22 wherein a record is the smallest sequence of bytes that is moved during an I/O operation between the data storage system and any-external entity which is using the data storage system to store data.

26. The data storage system of claim 22 wherein each segment has a fixed starting address in said address space and a fixed ending address in said address space that is a predetermined distance above the starting address for that segment.

27. The data storage system of claim 22 herein each group of the plurality of groups of each of said plurality of segments maps to a well-defined location in said address space.

28. The data storage system of claim 22 wherein each segment of said plurality of segments maps to a well-defined location in said address space.

29. The data storage system of claim 22 wherein each record belongs to a unique group of a unique segment.

30. The data storage system of claim 22 wherein each segment equals the size of a single storage disk.

* * * * *